(12) United States Patent
Shue

(10) Patent No.: US 6,745,563 B1
(45) Date of Patent: Jun. 8, 2004

(54) AXIALLY REDUCED TORQUE CONVERTER WITH AXIAL PULL STATOR

(75) Inventor: John Shue, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 9 days.

(21) Appl. No.: 10/065,013

(22) Filed: Sep. 10, 2002

(51) Int. Cl.$^7$ ............................................... F16D 33/00
(52) U.S. Cl. ............................. 60/345; 60/362; 60/367
(58) Field of Search ........................ 60/330, 345, 362, 60/364, 366, 367

(56) References Cited

U.S. PATENT DOCUMENTS

| | | |
|---|---|---|
| 4,044,556 A | 8/1977 | Kuramochi et al. |
| 4,186,557 A | 2/1980 | Arai et al. |
| 4,783,960 A | 11/1988 | Kubo et al. |
| 5,226,807 A | 7/1993 | By et al. |
| 5,507,622 A | 4/1996 | Avny |
| 5,586,434 A * | 12/1996 | Okubo et al. ................. 60/345 |
| 5,720,595 A | 2/1998 | Avny |
| 6,024,538 A * | 2/2000 | Tanishiki et al. ............. 60/330 |
| 6,099,435 A | 8/2000 | Halene et al. |
| 6,460,331 B2 * | 10/2002 | Sakuma et al. ............... 60/362 |

OTHER PUBLICATIONS

Jandasek, V. J., The Design of a Single Stage Three Element Torque Converter, SAE Publication, 1961.

* cited by examiner

*Primary Examiner*—Edward K. Look
*Assistant Examiner*—Michael Leslie
(74) *Attorney, Agent, or Firm*—David B. Kelley

(57) ABSTRACT

A torque converter for a vehicle having a substantially reduced axial length relative to a conventional circular-shaped torus cross section. The torque converter includes a turbine and an impeller, with a stator mounted generally therebetween. The stator is one piece and formed with axial pull shaped blades that have a reactor blade base axial length that extends for the majority of the radial length, a reactor shroud axial length that is less than the reactor blade base axial length, and a taper in the blade between the two axial lengths.

10 Claims, 1 Drawing Sheet

AXIALLY REDUCED TORQUE CONVERTER WITH AXIAL PULL STATOR

BACKGROUND OF INVENTION

The present invention relates to torque converters employed in vehicles with automatic transmissions.

Conventionally, torque converters employed in automotive vehicles have been designed as close to a circular-shaped torus cross section as possible. The reason for this is that the circular shape provided a smooth turning of the fluid and thereby an efficient hydrodynamic torque transfer between the impeller and turbine in the torque converter. With vehicles employing front wheel drive, however, the vehicle packaging space limitations make packaging a torque converter with a circular-shaped torus cross section difficult. In particular, there is a need to reduce the axial length of the torque converter as much as possible. However, this must be accomplished while still maintaining a certain amount of efficiency in transferring torque.

As a result, some have produced torque converters with a somewhat axially-squashed torus cross section, also sometimes called an oval torus. There has been some success at a reduction in axial length with components having a radial pull type of blades. A radial pull type of casting or molding process is one where two die halves are separated with a radial motion in order to release a finished part from the dies. For a torque converter stator formed with this process, the shroud portion of the stator cannot be molded integrally with the stator hub and blades. It must be formed separately and then attached. This adds expense to the manufacturing process. Further, the dies employed in the radial pull process are relatively complicated and expensive. A less expensive and simpler process than the radial pull process is axial pull casting or molding. In this process, the two die halves are separated with an axial motion in order to release the finished part. As for stators with the axial pull type blades, attempting to reduce the axial length of the torque converter makes it difficult to package a stator with reasonable blade length. When attempting to obtain a great deal of reduction in the axial length of the torque converter with axial pull type blades, the efficiency of the torque converter becomes too low. Consequently, the axial length reduction of torque converters is generally less than thirty present as compared to a round torus shape.

Thus, it is desirable to have a torque converter with a substantially reduced axial length compared to a conventional round torus shaped cross section that allows for the use of axial pull blades, while maintaining adequate efficiency in transferring the torque through the torque converter.

SUMMARY OF INVENTION

In its embodiments, the present invention contemplates a torque converter for use in a vehicle with an engine, which has a crankshaft, and a transmission, which has an input shaft and a stator shaft. The torque converter includes a cover, adapted to rotatably mount to the crankshaft, an impeller having an impeller housing rotatably coupled to the cover, and a turbine, adapted to rotatably mount to the input shaft and located generally within the cover and impeller housing. The torque converter also includes a stator assembly, located generally between the impeller and the turbine, having a one-way clutch adapted to mount to the stator shaft, and having a stator hub, a stator shroud, and a plurality of axial pull blades that extend in a generally radial direction from the stator hub to the stator shroud, with axially straight intersections between the blades and the hub and between the blades and the stator shroud, and with the stator hub, stator shroud and stator blades integrally formed as a single unit and mounted on the one-way clutch.

An embodiment of the present invention allows for a torque converter with an axial reduction over a conventional round torus shaped cross section of greater than thirty percent while still maintaining adequate efficiency of the torque converter.

An advantage of the present invention is that a stator of a squashed torque converter can still be formed with the less expensive axial pull type blades, and yet still maintain a high level of efficiency in transferring torque.

DETAILED DESCRIPTION

Figure 1:
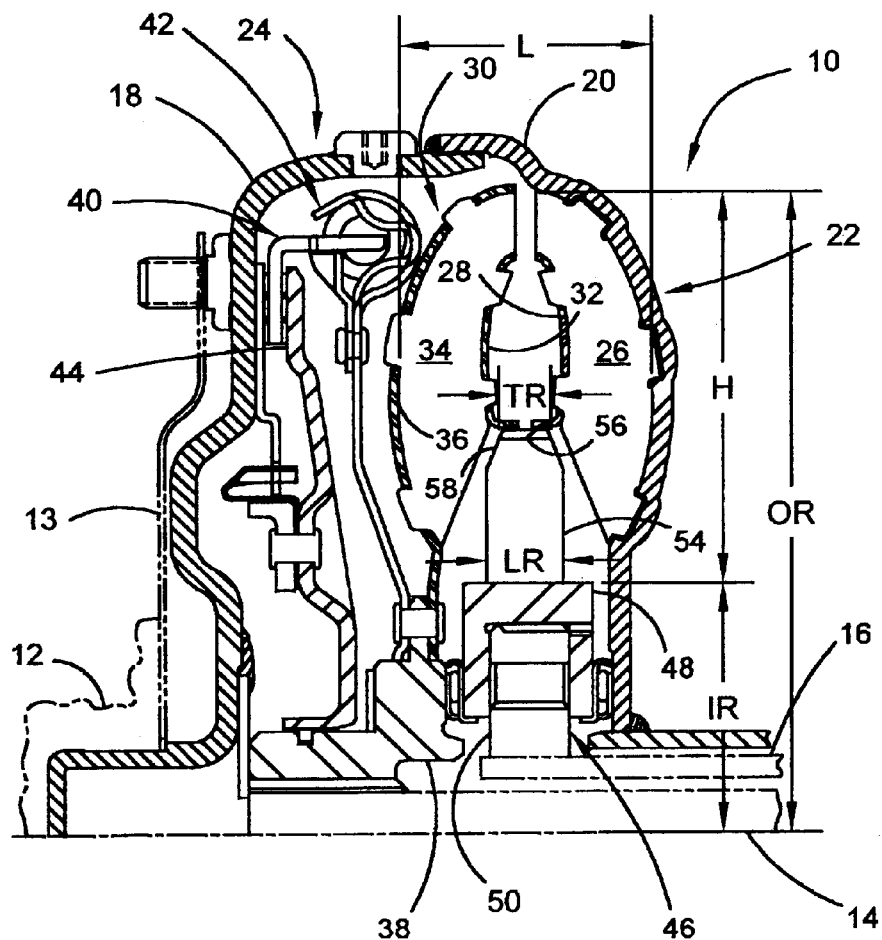
FIG. 1 is a sectional view of a torque converter in accordance with the present invention.

FIG. 1 illustrates a torque converter assembly 10 that is designed to mount between a crankshaft 12 of an engine (not shown) and an input shaft 14 and a stator shaft 16 of a transmission (not shown). When employing the term transmission herein, it also includes transaxles employed in vehicles.

The torque converter assembly 10 includes a cover 18 that is mounted to and is rotationally driven by the crankshaft 12, typically via a flex plate 13. An impeller housing 20, which forms part of an impeller assembly 22, is mounted to and driven by the cover 18. The impeller housing 20 and cover 18 together form a torque converter housing 24. The impeller assembly 22 also includes impeller blades 26, mounted to the inside of the housing 20, and an impeller shroud 28, mounted on the inside surfaces of the blades 26. The torque converter assembly 10 also has a turbine assembly 30, including a turbine shroud 32, mounted to the inner surfaces of turbine blades 34, which are in turn mounted to the inner surface of a turbine shell 36. The turbine shell 36 mounts to and rotates with a turbine hub 38, which is mounted to and drives the transmission input shaft 14. Also mounted to the turbine hub 38 is a lock-up assembly 40, which includes a coiled spring damper 42 and a piston clutch plate 44. When the lock-up assembly 40 is engaged, the torque from the crankshaft 12 is mechanically transferred directly from the cover 18 to the turbine hub 38 and thus to the transmission input shaft 14, bypassing the fluid coupling of the impeller assembly 22 and turbine assembly 30.

The torque converter assembly 10 includes a stator assembly 46 (also called a reactor). The stator assembly 46 includes a stator hub 48 mounted on a radially outer portion of a one-way clutch 50, with a radially inner portion of the one way clutch 50 mounted on the stator shaft 16. The stator assembly 46 has stator blades 54 molded with and extending from the stator hub 48, and a stator shroud 56 formed onto the radially outer ends of the stator blades 54. The stator blades 54 have an axial length of LR at their radially inner ends the stator blade base axial length. The stator blades 54 are the full axial length LR for the majority of their radial lengths. Toward the radially outer ends of the stator blades 54, they taper off to an axial length of TR in order to allow for maximum overall axial stator blade length, while still avoiding interference between the stator and turbine blades 54, 34 and the impeller blades 26. The stator shroud 56 is sized to be about as wide as the stator blades 54 at the radially outer location where it connects to them. Since reducing the axial length of a torque converter assembly most adversely affects the efficiency of the stator due to the fact that the stator blades 54 extend mostly along the axial direction maximizing the axial stator blade length will increase the efficiency of the torque. converter 10.

The stator hub 48, stator blades 54 and stator shroud 56 are cast or molded together as one integral part using an axial pull drafting method. The stator shroud 56 and stator hub 48 are axially straight in order to allow for proper drafting during the axial pull manufacturing process. Also, the stator blade thickness is preferably as thin as the manufacturing method allows, and with a blade cross section that is rectangular, in order to maximize the number of blades 54 that can be produced with this type of manufacturing method. Casting (or molding) these stator components as one integral part is less expensive than forming separate parts and then assembling them. Further, by casting with an axial pull drafting method, the integral part is less expensive to fabricate than if the stator blades were required to be formed with a radial pull drafting method. Yet, by cutting off a portion of the two radially outer corners 58 of the stator blades 54, this allows for full axial blade length of the stator blades 54 along most of their radially length without interfering with the impeller blades 26 and turbine blades 34. As a result, the fluid passing through the stator 46 is given adequate passage length to change its flow direction gradually in order to reduce internal flow losses, thus preserving the overall efficiency of the torque converter 10, even when it is significantly reduced axially as compared to a conventional circular-shaped torus cross section.

A conventional circular-shaped torus cross section will have a ratio of torus radial height to torus axial length of about 1.0. In the present invention the ratio of torus axial length L to torus radial height H (the difference between the torus outer radius OR and the torus inner radius IR) is preferably between 0.5 and 0.7, which is a squashing in the axial direction of about 30 to 50 percent from the conventional circular-shaped torus cross section. Although, the ratio L/H can be as high as 0.9 if packaging room in the engine compartment of the vehicle is available. The outer radius OR is mostly determined by the torque capacity requirement of the engine, with the inner radius being preferably set to a ratio of 0.35<IR/OR<0.45. With the stator design of the present invention, the torque converter 10 still maintains good efficiency of torque transfer, even with this 30–50 percent squashing.

While certain embodiments of the present invention have been described in detail, those familiar with the art to which this invention relates will recognize various alternative designs and embodiments for practicing the invention as defined by the following claims.

What is claimed is:

1. A torque converter for use in a vehicle with an engine, which has a crankshaft, and a transmission, which has an input shaft and a stator shaft, the torque converter comprising:

a cover, adapted to rotatably mount to the crankshaft;

an impeller having an impeller housing rotatably coupled to the cover;

a turbine, adapted to rotatably mount to the input shaft, located within the cover and impeller housing; and a stator assembly, located between the impeller and the turbine, having a one-way clutch adapted to mount to the stator shaft, and having a stator hub, a stator shroud, and a plurality of axial pull blades that extend in a radial direction from the stator hub to the stator shroud, with each of the axial pull blades intersecting the stator hub to form a respective one of a plurality of axially straight hub intersections and each of the axial pull blades intersecting the stator shroud to form a respective one of a plurality of axially straight shroud intersections, with the stator hub, stator shroud and stator blades integrally formed as a single unit and mounted on the one-way clutch, and with each of the axial pull blades having a first edge facing the turbine, a spaced second edge facing the impeller, and a blade base axial length defined between the first edge and the second edge and beginning at the respective hub intersection and extending radially outward for the majority of the radial length of each of the axial pull blades thereby defining a radially inner portion having a rectangular shape in the axial direction, and with each of the axial pull blades having a shroud axial length defined between the first edge and the second edge at the location where the respective axial pull blade connects to the stator shroud, with the shroud axial length being less than the blade base axial length, and with the first edge of each axial pull blade having a first taper portion extending from the radially inner portion to the shroud and the second edge of each axial pull blade having a second taper portion extending from the radially inner portion to the shroud.

2. The torque converter of claim 1 wherein the impeller includes a plurality of impeller blades extending from the impeller housing and a shroud mounted to the plurality of impeller blades, with each of the impeller blades including a stator edge extending between the impeller housing and the shroud and facing toward the stator assembly, and with each stator edge having a length and extending parallel to the first taper portion of the plurality of axial pull blades along the entire length of the stator edge.

3. The torque converter of claim 1 wherein the turbine includes a turbine housing a plurality of turbine blades extending from the turbine housing, and a shroud mounted to the plurality of turbine blades, with each of the turbine blades including a stator edge extending between the turbine housing and the shroud and facing toward the stator assembly, and with each stator edge having a length and extending parallel to the second taper portion of the plurality of axial pull blades along the entire length of the stator edge.

4. The torque converter of claim 1 wherein a torus is formed by the impeller, the turbine, and the stator, and the torus has a torus axial length and a torus radial height, with the ratio of the torus axial length to the torus radial height in the range of about 0.5 to 0.9.

5. The torque converter of claim 4 wherein the ratio of the torus axial length to the torus radial height is in the range of about 0.5 to 0.7.

6. The torque converter of claim 5 wherein the torus has a torus outer radius and a torus inner radius, and a ratio of the torus inner radius to the torus outer radius is in the range of about 0.35 to 0.45.

7. The torque converter of claim 1 further including a lock-up clutch selectively engagable between the cover and the turbine.

8. A torque converter for use in a vehicle with an engine, which has a crankshaft, and a transmission, which has an input shaft and a stator shaft, the torque converter comprising:

a cover, adapted to rotatably mount to the crankshaft;

an impeller having an impeller housing rotatably coupled to the cover;

a turbine, adapted to rotatably mount to the input shaft, located within the cover and impeller housing;

a stator assembly, located between the impeller and the turbine, having a one-way clutch adapted to mount to the stator shaft, and having a stator hub, a stator shroud, and a plurality of axial pull blades that extend in a radial direction from the stator hub to the stator shroud, with each of the axial pull blades intersecting the stator hub to form a respective one of a plurality of axially straight hub intersections and each of the axial pull blades intersecting the stator shroud to form a respective one of a plurality of axially straight shroud intersections, with the stator hub, stator shroud and stator blades integrally formed as a single unit and mounted on the one-way clutch, and with each of the axial pull blades having a first edge facing the turbine, a spaced second edge facing the impeller, and a blade base axial length defined between the first edge and the second edge and beginning at the respective hub intersection and extending radially outward for the majority of the radial length of each of the axial pull blades thereby defining a radially inner portion having a rectangular shape in the axial direction, and with each of the axial pull blades having a shroud axial length defined between the first edge and the second edge at the location where the respective axial pull blade connects to the stator shroud, with the shroud axial length being less than the blade base axial length, and with the first edge of each axial pull blade having a first taper portion extending from the radially inner portion to the shroud and the second edge of each axial pull blade having a second taper portion extending from the radially inner portion to the shroud; and wherein a torus is formed by the impeller, the turbine, and the stator, and the torus has a torus axial length and a torus radial height, with the ratio of the torus axial length to the torus radial height in the range of about 0.5 to 0.9.

9. The torque converter of claim 8 wherein the ratio of the torus axial length to the torus radial height is in the range of about 0.5 to 0.7.

10. The torque converter of claim 9 wherein the torus has a torus outer radius and a torus inner radius, and a ratio of the torus inner radius to the torus outer radius is in the range of about 0.35 to 0.45.

* * * * *